Jan. 28, 1947.  P. D. WURZBURGER  2,414,995

PIPE COUPLING

Filed Sept. 27, 1944

INVENTOR.
PAUL D. WURZBURGER
BY
John C. Kerr
ATTORNEY

Patented Jan. 28, 1947

2,414,995

UNITED STATES PATENT OFFICE 2,414,995

PIPE COUPLING

Paul D. Wurzburger, Cleveland, Ohio

Application September 27, 1944, Serial No. 556,007

7 Claims. (Cl. 285—122)

My present invention relates to pipe couplings wherein an unthreaded end of a pipe or tube is connected by a solderless joint with a body to which connection is desired, the joint being hydraulically and mechanically perfect.

More particularly the invention relates to an improvement in pipe fittings of the "Ermeto" type, such as are disclosed, for example, by United States Patents Nos. 2,139,413 granted December 6, 1938, 2,171,217 granted August 29, 1939, 2,201-404 granted May 21, 1940, 2,211,856 granted August 20, 1940, and 2,230,116 granted January 28, 1941.

In making fittings of the type above referred to, difficulties have occasionally been experienced in coupling a relatively hard pipe such as one made of ferrous material to a relatively soft coupling body member such as one made of brass. Various expedients have been resorted to in the prior art for overcoming this difficulty. One such expedient is shown in Patent No. 2,230,116, above referred to, wherein the packing member $b$ used therein is surface or case hardened, so as to be harder than the material of the pipe and so that the leading edge thereof will be enabled to cut into the material of the pipe in the manner characteristic of "Ermeto" type pipe fittings. In this case the surface $d'$ of the inside of the flaring mouth of the body member is surface hardened sufficiently so that the forward outer edge of the packing member will not dig into it upon completion of the coupling due to the initial substantially line contact of the parts, which might cause such damage to the flaring mouth portion that the coupling could not be properly completed, or, if completed, could not be uncoupled and again recoupled, which is a desired characteristic of fittings of this type.

Another expedient which has been resorted to for overcoming this difficulty is to undercut the forward inner edge portion of the packing member as shown in Patent No. 2,211,856 above referred to, so that the portion in contact with the flaring mouth is made so thin that it can bend inwardly to a substantial extent and will force the cutting edge inwardly as shown in that patent. This expedient, however, is subject to the objection that the forming of packing members in this way requires a delicate and accurate machining operation which it is desired to avoid.

Another solution of this problem is disclosed in my copending application Serial No. 556,004, filed September 27, 1944, which sets out certain dimensional limitations based on the relative hardness of the materials of the several parts so that the desired results will be attained.

The present invention seeks to secure these desired results in another way, specifically by providing a packing member made of portions of two different materials respectively, the first being a relatively harder material, which is located inside the packing member, so as to be available to cut into the pipe to complete the fitting in the manner usual with "Ermeto" type fittings. This relatively hard portion of the packing member preferably extends from end to end of the packing member as a whole, so as to sustain the compressive forces to which the packing member is subjected in completing the coupling. In this respect my present invention constitutes an improvement over the device shown in Figs. 4 and 5 of Patent No. 2,139,413 above referred to. According to my present invention the outer portion at least of the packing member, which is located in such a position as to come into contact with the flaring mouth of the body member, is of relatively softer material than that of such flaring mouth and of such character that it will not injure this flaring mouth upon completion of the coupling. The provision of a composite packing member as above set forth is a principal object of the present invention.

Various particular embodiments of the above described general combination and which embodiments will be more specifically described hereinafter, constitute more specific objects of the present invention and include provision for end-for-end interchangeability of the packing member, so as to facilitate assembly of the couplings by relatively unskilled labor and also detailed constructional embodiments as will appear hereinafter.

Other objects of the present invention will become apparent from the following specification and appended claims, taken in connection with the accompanying drawing in which:

Figure 1:
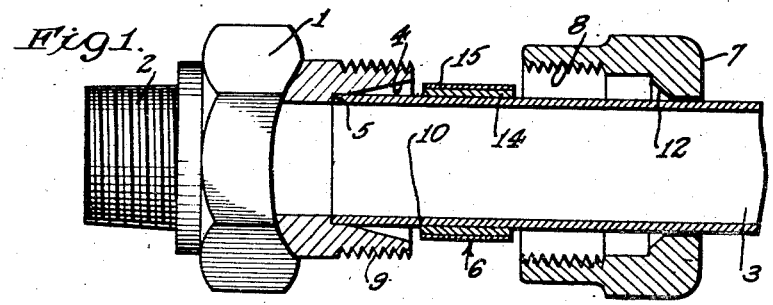
Figure 1 is a view partly in elevation and partly in central section showing a coupling including a packing member in accordance with the present invention, the parts being shown prior to the completion of the coupling.
Figure 2:
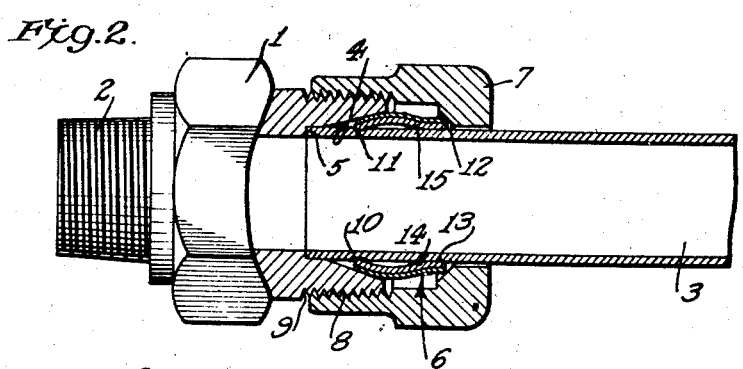
Fig. 2 is a view similar to Fig. 1 showing the parts in the position they occupy upon the completion of the coupling.

Referring now specifically to the drawing, there is shown a coupling body member 1, Figs. 1 and 2, which is adapted to be secured as by a threaded portion 2 to any desired means or structure in the usual manner. The device of the present invention is adapted to couple a pipe or tube 3 to the member 1. For this purpose the body member 1 has a flaring mouth 4 at its forward end and a shoulder 5 against which the end of the pipe 3 is adapted to abut. There is also provided a packing member generally indicated at 6, which surrounds the pipe 3 and is adapted to secure the pipe to the body member as hereinafter set forth. Means are provided for moving the packing member 6 axially of the pipe and in relation to the body member 1, such means comprising in this instance a nut 7 having internal threads 8 adapted to mesh with external threads 9 on the body member 1 as shown by comparison of Figs. 1 and 2. Upon completion of the coupling, which is accomplished by threading the nut 7 onto the body member and tightening it to a desired extent, the packing member 6 is forced into engagement with the flaring mouth 4 of the body member 1, so that the forward portion thereof is constricted, as shown in Fig. 2 to the extent of forcing the forward sharp inner edge 10 thereof into biting engagement with the pipe 3 as shown at 11, Fig. 2. When the packing member 6 is moved axially by the nut 7 into contact with the flaring mouth 4, the initial engagement of these parts is substantially a line contact between the forward outer edge of the packing member and the flaring mouth. If the portion of the packing member contacting the flaring mouth were substantially harder than the material of the mouth, i. e., that of the body 1, it would tend to dig or bite into it upon further axial movement of the packing member. This undesired action is overcome by the construction as herein specifically described. An inclined surface 12 of the nut 7 contacts with the outer rear edge or curve of the packing member 6 and not only causes axial movement of the packing member with the results aforesaid, but also forces the rear portion of the packing member into gripping engagement with the pipe 3 as shown at 13, Fig. 2. It is, of course, necessary that the packing member have at least one portion of material sufficiently harder than the pipe, so that it will bite into it, as shown at 11. If the pipe is of ferrous material, it is conventional to make this portion of the packing member of steel harder than the pipe at least on the surface. However, if the entire packing member were homogeneous or surface hardened throughout its entire surface, there would be a great danger that instead of being merely cammed inwardly by the flaring mouth 4 of the body member 1, it would dig into the surface of this flaring mouth, injuring it. The present invention provides a packing member which is provided with a second portion of a softer material for contact with the flaring mouth 4. It may be desired to form the body member 1 of a relatively soft material such as brass or some other free cutting and relatively soft metal, although this is not required in all cases. However, it is the purpose of the present invention to provide a packing member 6, which is formed of portions of two different materials, or materials having different hardnesses, so that the portion of the packing member which is required to bite into the pipe is harder than the pipe and preferably also extends from end to end thereof so as to carry and sustain the compressive forces to which the packing member is subjected by the tightening of the nut 7 without buckling, which might defeat the purpose of the entire coupling. At the same time it is desired that the material in contact with the flaring mouth be softer than the material of that mouth, so as to insure against damaging the mouth and to permit the coupling to be disassembled and again reassembled a number of times without damage to the parts and affording a hydraulically perfect or fluid-tight joint each time the coupling is assembled.

There is shown herein a number of different constructions for the packing member generally indicated at 6. In Figs. 1 and 2 the member 6 is formed as a bimetallic tube, wherein the inside portion 14 is of relatively harder material such, for example, as steel when the pipe 3 is of softer material and the outside portion 15 is of relatively softer material such as copper when the body member 1 is of brass or steel. Packing members of this type may be made of bimetallic tubing by merely cutting such a tube into lengths and suitably finishing the ends thereof to remove burrs and give a desired curvature to the outside ends, which may be the same or different at the two ends.

It is often desirable that the packing member be the same at the opposite ends or be symmetrical on both sides of a center portion as this makes for end-for-end interchangeability, which enables the couplings to be assembled by relatively unskilled labor without the possibility of injuring or damaging the parts. Several of the embodiments of the invention disclosed herein have such end-for-end interchangeability, particularly the forms shown in Figs. 1, 4 and 5 and to a substantial extent also the form shown in Fig. 3.

Various bimetallic combinations may be employed for the packing member such as that disclosed above of copper-carbon steel. I contemplate the use of combinations such as red brass-carbon steel, copper-stainless steel, copper-aluminum alloy, aluminum alloy-carbon steel, copper-brass, cupro-nickel-alloy-steel (the material of the outer portion or that for contact with the flaring mouth being stated first in each instance). I also contemplate that under certain circumstances, some of the organic plastic materials which have the necessary physical characteristics to make them usable in this combination may be employed as the softer portion of the packing member, the requirements being only that the harder inner portion of the packing member be sufficiently harder than the pipe to be coupled so as to bite into it as shown at 11, Fig. 2, upon completion of the coupling; that the harder portion of the packing member, which must sustain the compressive forces incident to completing the coupling, should extend from end to end thereof; that the softer portion of the packing member should be located at least in that part of the packing member which must come into contact with the flaring mouth of the body member and be softer than the material of such flaring mouth; and further that the softer portion of the packing member should be suitably secured or be held rigid with the harder portion thereof so as to prevent relative axial dislodgment of the two portions to the extent that the harder portion of the packing member is prevented from coming into contact with the flaring mouth of the body member by cold flow of the softer material of the packing member.

Figure 3:
Fig. 3 is a fragmentary detailed view principally in transverse section showing a modified construction for the packing member.

In some instances it may be desired to provide a packing member wherein the harder portion thereof is heat treated in such a way as to provide desired physical characteristics thereto or at least for the surface thereof. Under such circumstances it might be difficult to provide the desired treatment if the softer portion thereof were assembled therewith at the time of the heat treatment. For this reason I contemplate that the harder and softer portions of the packing member may be independently formed and/or treated and thereafter assembled together, for example by providing a structure as shown in Fig. 3, wherein there is shown at 16 an internally harder portion and a relatively softer portion 17 outside it. In this case it will be noted that the outer surface of the portion 16 and the inner surface of the portion 17 are provided with corresponding tapers, which may be very slight, but are sufficient to permit easy assembly of the two portions. In this case the softer portion 17 extends from end to end of the packing member and the taper is so slight that while it facilitates assembly, it does not defeat substantial end-for-end interchangeability of the packing member as a whole.

Figure 4:

In Fig. 4 a further embodiment of the invention is shown wherein a harder portion 18 is metallized at least on the outside in a suitable way, for example, by electro-plating thereon a suitable material shown at 19. In this case it is practically necessary that any of the material 19 which coats the inner surface of the member 18 will be sufficiently thin as not to defeat the purpose of the coupling, that is not to prevent the leading edge thereof from biting into the pipe as shown at 11, Fig. 2. In fact, no inner coating at all is desired, but a certain amount of the softer material will normally plate onto the inside unless expensive expedients are resorted to. I have therefore given the limitations on this inner coating. At the same time the layer of softer material 19 outside the member 18 should be of sufficient thickness to provide an adequate cushion between the forward end of the member 18 and the flaring mouth 4 so as not to damage the latter upon the completion of the coupling. For this reason I contemplate that the outer portion should have a thickness at least in the order of magnitude of about 0.010 inch while the inside may be plated to only about 0.005 inch. In any case it is an essential of the present invention that the outside portion of softer material be of sufficient thickness actually to serve as a cushion and hence to prevent damage to the flaring mouth. Such a thin plating of softer material as might serve merely as a lubricant or seal, but not as a cushion, and might be only a few ten thousandths of an inch in thickness would not be adequate to fulfill this requirement. Such a plating for the purpose of a lubricant or seal is disclosed in my British Patent No. 534,291, accepted March 4, 1941. The outer corners of the harder portion 18 are preferably rounded as shown, which assists in securing the objects above set forth and is peculiarly adapted for being coated by a metalizing treatment as plating.

Figure 5:
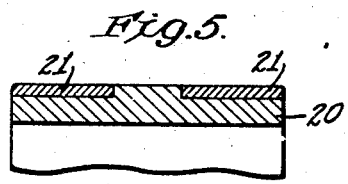
Figs. 4, 5, 6, 7 and 8 are views similar to Fig. 3 showing further embodiments of the invention.

In Fig. 5 there is shown another form of the present invention wherein the packing member comprises a harder portion 20 having reduced diameter outer end portions or recesses filled with softer material as shown at 21 at each end thereof. This construction affords end-for-end interchangeability as hereinabove set forth.

Figure 6:
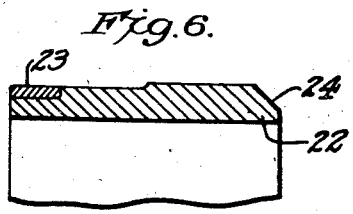

Fig. 6 shows a packing member having a harder portion 22 of a general form similar to that of many of the packing members of the U. S. patents above referred to and having but a small insert 23 of softer material adjacent to the leading edge only. The rear outer edge part of the member 22 is bevelled as shown at 24 for cooperation with the inclined surface 12 of the nut 7 (Fig. 1).

Figure 7:
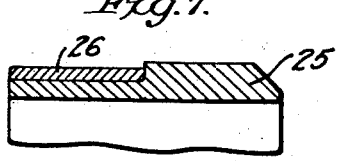

In Fig. 7 there is shown a modification of the invention similar to Fig. 6 comprising a packing member including a harder portion 25 and a softer portion 26 which is relatively larger than the softer portion 23 of Fig. 6. This provides for a longer part of the harder portion 25 of less average thickness, which may be advantageous in certain instances.

Figure 8:
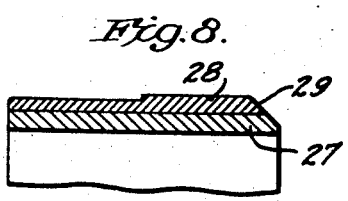

In Fig. 8 there is shown a packing member having a harder portion 27 and a softer portion 28, which extends substantially from end-to-end of the harder portion, thus rendering the construction of the harder portion of the device somewhat simpler as it may be made of tubular material or stock. In this form the outer rear corner is bevelled as shown at 29 for cooperation with the inclined surface 12 as previously described for the bevelled surface 24, Fig. 6.

While I have shown and described herein a number of different embodiments of my present invention and fully set forth the principles and requirements thereof, I contemplate that other variations may be made within the limits of the requirements as laid down herein, such other embodiments being obvious to those skilled in the art. I do not wish to be limited, therefore, except by the scope of the appended claims, which are to be construed validly as broadly as the state of the art permits.

I claim:

1. A coupling for a pipe, comprising a body member having a flaring mouth, a packing member having a portion extending from end to end thereof of metallic material harder than said pipe and having a forward inner cutting edge adapted to be constricted into biting engagement with said pipe and a second portion of substantial thickness surrounding the forward outer part at least of the first mentioned portion which is of metallic material softer than the material of the flaring mouth of said body member and adapted for contact therewith, said second portion being secured against substantial axial movement in respect to the first named portion, and means cooperating with said body member for axially moving said packing member to bring said second named portion thereof into camming engagement with the flaring mouth of said body member, said packing member and said flaring mouth being so constructed and arranged as to have an initial substantially line contact, followed on further axial movement of said packing member by an inward contricting contact, so as to constrict said cutting edge into biting engagement with said pipe and to plow a groove into the pipe upon continued axial movement in respect to said flaring mouth.

2. A coupling for a pipe in accordance with claim 1, wherein both the named portions of said packing member extend substantially from end to end thereof in an axial direction.

3. A coupling for a pipe in accordance with claim 1, wherein both the named portions of said packing member extend substantially from end to end thereof in axial direction, and wherein both the forward and rear inner edges of said first named portion of said packing member are formed as sharp cutting edges so as to provide end-for-end interchangeability of said packing member.

4. A coupling for a pipe in accordance with claim 1, wherein the second named portion of said packing member is formed as two separate inserts which are located respectively adjacent to each end of said packing member outside the first-named portion and respectively prevented from movement toward the end opposite that at which they are located by a central rib part of the first named portion of the packing member intermediate said inserts, and wherein the first named portion of the packing member has both its forward and rear inner edges sharp to provide end-for-end interchangeability for said packing member, so that irrespective of which end is positioned toward said body member, the camming action of said flaring mouth will cause the portion of said packing member in contact therewith to be constricted inwardly causing the sharp leading inner edge to bite into said pipe.

5. A coupling in accordance with claim 1, wherein the second named portion of said packing member is applied to the first named portion thereof by a plating operation, so as to provide a coating on the outside of the first named portion of said packing member of such thickness as to provide a cushion preventing the harder first named portion of the packing member from digging into and damaging the flaring mouth of said body member upon completion of the coupling, and the coating of the softer material plated on the inside of the harder portion of said packing member being sufficiently thin so as not to interfere with the cutting engagement of the forward sharp inner edge of the harder portion of said packing member into said pipe upon constriction of the forward end portion thereof by the camming action of said flaring mouth.

6. A coupling for a pipe of ferrous material in accordance with claim 1 wherein the first named portion of said packing member is of steel which is surface hardened and thereafter plated with a softer metal by a plating operation forming the second portion thereof, said metal forming the second portion being softer than the material of the flaring mouth of said body member and being of sufficient thickness at least at the portion thereof adapted to come into contact with said flaring mouth so as to form a cushion upon constriction of the forward portion of said packing member in completing the coupling and to prevent the harder first named portion of said packing member from causing injury to said flaring mouth.

7. A coupling for pipe of ferrous material in accordance with claim 1, wherein said packing member has its first named portion of steel, harder than the material of said pipe at least on its surface to adapt it to bite into said pipe upon completion of the coupling, wherein the second named portion of said packing member is of copper, and wherein at least the camming surface of the flaring mouth of said body member is of brass harder than the copper of the second named portion of said packing member.

PAUL D. WURZBURGER.